Feb. 28, 1950 E. H. SCHOENFELD 2,498,900

ELECTRONIC SIGNAL SHAPING CIRCUIT

Filed July 28, 1943 2 Sheets-Sheet 1

INVENTOR.
EARL H. SCHOENFELD
BY
H. S. Grover

INVENTOR.
EARL H. SCHOENFELD
BY
H. S. Grover.

Patented Feb. 28, 1950

2,498,900

UNITED STATES PATENT OFFICE 2,498,900

ELECTRONIC SIGNAL SHAPING CIRCUIT

Earl H. Schoenfeld, Mamaroneck, N. Y., assignor to Radio Corporation of America, a corporation of Delaware Application July 28, 1943, Serial No. 496,399

5 Claims. (Cl. 250—27)

This invention relates to electrical generators for developing voltages or currents of appropriate wave form to control the deflection of cathode ray beams. More particularly, the invention relates to a circuit arrangement for producing desired electrical waves for electrostatically deflecting a cathode ray beam in a cathode ray oscilloscope or other cathode ray device.

It is well known that the cathode ray beam in a cathode ray tube may be deflected from its normal path under the influence of electromagnetic or electrostatic fields, and when the latter method of deflection is used, the cathode ray tube generally includes two pairs of electrostatic beam deflecting plates positioned within the tube envelope.

Cathode ray tubes of the electrostatic deflection type are conventionally used in cathode ray oscilloscopes, and in such instruments it is generally customary to apply a deflection potential to one pair of the deflecting electrodes to cause the beam repeatedly to traverse the tube target or screen in a horizontal direction at a predetermined rate, while potential variations under observation are applied to the other pair of deflection plates which cause the cathode ray beam to be simultaneously deflected in vertical directions depending upon the intensity of the voltage variations applied to these plates.

In most observations the horizontal deflection of the cathode ray beam is maintained substantially linear, so that the rate at which the beam is deflected horizontally across the screen remains uniform throughout its entire sweep. At the end of the deflection the cathode ray beam is generally returned very rapidly to its start position, from which it is again deflected in a similar manner. In some instances, provisions are made whereby the cathode ray beam is suppressed, or its formation is discontinued during the return trace.

In other applications of the cathode ray oscilloscope, it may be desirable to deflect the cathode ray beam at a varying rate across the screen or target of the tube, and when certain transient conditions or voltage variations are to be observed, it is sometimes desirable to have the rate of horizontal deflection vary sinusoidally from the beginning to the end of the deflection stroke.

In order to produce truly sinusoidal deflections or truly linear deflections of the cathode ray beam with rapid or substantially instantaneous return in either case, various circuit arrangements have heretofore been provided, but in most cases these circuit arrangements are somewhat complex, and in some cases the deflection is not truly sinusoidal or linear. By means of the present invention it is possible to generate a truly sinusoidal voltage variation which, when applied to the deflecting plates of the cathode ray tube, will cause the beam in the tube to be deflected in one direction according to a sinusoidal function and be returned substantially instantaneously. Furthermore, according to the present invention it is possible to produce a voltage variation which varies in a strictly linear fashion between predetermined limits so that when this voltage variation is applied to a pair of deflecting plates in the cathode ray tube, the beam may be deflected in a substantially perfectly linear manner.

The circuit arrangements for producing sinusoidal or linear voltage variations in accordance with the present invention are simple, and the desired voltage variations may be derived directly from the deflection generator without the necessity of including additional tubes or circuits for wave shaping purposes or for improving the fidelity of the sinusoidal or linear voltage variation.

It is, therefore, one purpose of the present invention to provide a simple circuit arrangement for generating voltage variations for sinusoidally deflecting the cathode ray beam in one direction and for returning the cathode ray beam to its initial position in a relatively short length of time.

Another purpose of the present invention resides in the provision of a simple circuit arrangement for linearly deflecting a cathode ray beam across a screen or target electrode and for returning the cathode ray beam to its initial position in a relatively instantaneous manner.

A further purpose of the present invention resides in the provision of a circuit arrangement for deflecting a cathode ray beam according to a sinusoidal function with the rate of deflection at a maximum at approximately the midpoint of the deflection cycle.

Still another purpose of the present invention resides in the provision of means whereby desired sinusoidal or linear deflections of the cathode ray beam may be accomplished from a conventional alternating current power line supply.

Various other purposes and advantages of the present invention will become more apparent to those skilled in the art from the following detailed description particularly when considered in connection with the drawings wherein like reference characters represent like parts, and wherein.

Figure 1:
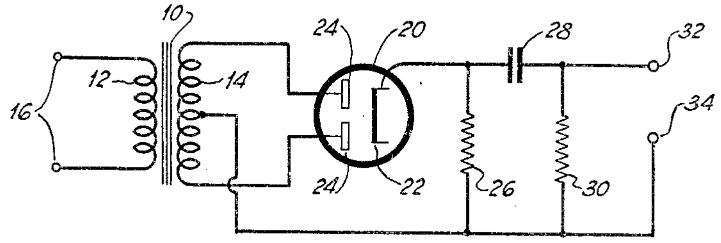
Figure 1 shows one form of the present invention for generating voltage variations which vary sinusoidally in order that a cathode ray beam may be deflected according to a sinusoidal function.

Referring now to the drawings, and particularly Figure 1 thereof, there is shown a transformer 10 having a primary winding 12 and secondary winding 14. The primary 12 is provided with input terminals 16 to which are applied alternating current potential variations from a conventional power line or sine-wave generator having a substantially sinusoidal wave form. A full wave rectifier 20 is provided having a cathode 22 and anodes 24. The ends of the secondary winding 14 are connected to the anodes 24, and a midpoint of the secondary winding is connected to ground or some other point of relatively fixed potential.

Figure 2:
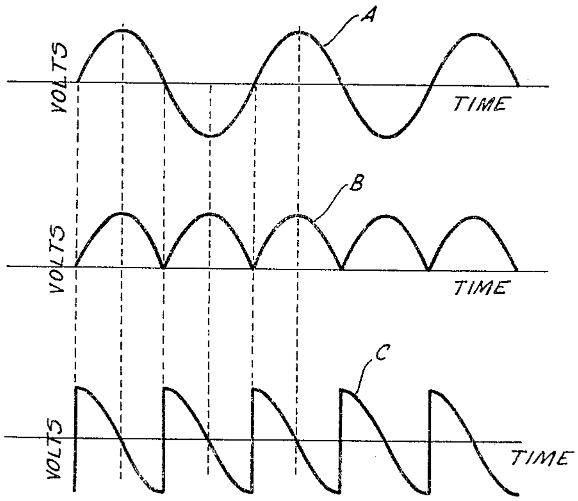
Figure 2 shows a group of curves representing potential variations present in the circuit arrangement shown in Figure 1.

When substantially sinusoidal power line potential variations are applied to the primary winding 12 by means of the input terminals 16, the rectifier 20, operating in conjunction with the secondary of the transformer 10, will produce pulsating potential variations of positive polarity at the cathode thereof, each potential variation corresponding to one-half cycle of a sine wave. In Figure 2, curve A represents the potential variations applied to the input terminals 16, and curve B represents the potential variations available at the cathode 22 of the rectifier 20.

Connected between the cathode and the midpoint of the secondary winding 14 or to ground is a load resistance 26, and connected in parallel with the load resistance is a differentiating network including capacitance 28 and resistance 30. One output terminal 32 is then connected to the junction of the condenser 28 and resistor 30. Another output terminal 34 is connected to ground or to the midpoint of the secondary winding 14.

The differentiating network 28—30 causes a voltage variation to appear at the output terminal 32—34 corresponding to the first derivative of the pulsating voltage variations present at the cathode of tube 20 and represented by the curve B in Figure 2. This differentiated voltage variation is represented by the curve C in Figure 2, and since the pulsating potential variations represented by curve B are sinusoidal (i. e., correspond to a succession of half wave sine curves of the same polarity) the first derivative available at the output terminals 32—34 will also be sinusoidal, varying from a maximum to a minimum and abruptly or substantially instantaneously changing to a maximum.

Accordingly, when a potential variation such as that represented by the curve C is applied to the deflecting plates of the cathode ray tube, the cathode ray beam will be deflected at a rate varying according to a sine function in one direction, and will be returned substantially instantaneously to its initial position at the completion of the deflection stroke.

Figure 3:
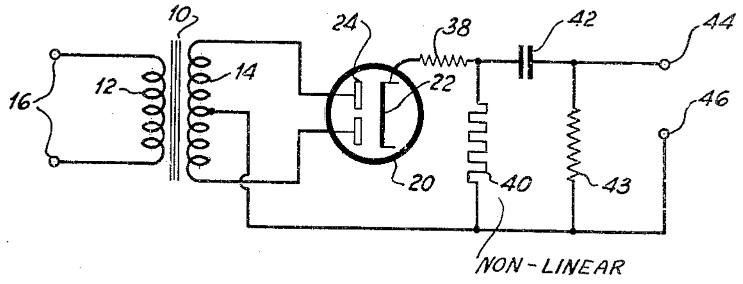
Figure 3 shows one form of a circuit arrangement in accordance with the present invention for producing voltage variations for deflecting a cathode ray beam at a constant rate and in a linear manner.

Referring now to Figure 3, a somewhat similar circuit arrangement is provided which includes transformer 10 and full wave rectifier 20. A load circuit including resistance 38 and element 40 is connected between the cathode 22 and the midpoint of the secondary winding 14, and the characteristics of the element 40 of the load circuit are so chosen that its resistance will decrease on an increase in applied potential. When the desired relationship is established, the potential variation present at the junction of the resistance 38 and the element 40 will be parabolic, as represented by curve D in Figure 4. This conversion from a sinusoidal variation to a parabolic potential variation is a result of the operation and characteristics of the load circuit element 40. Although various arrangements may be provided to accomplish this purpose, in some instances resistance elements such as carbon, which has a negative temperature coefficient, or a resistance element such as "Ohmax", may be used to produce the desired result. If such devices are used, then provision should be made whereby the element 40 may vary in temperature in order that the desired negative temperature characteristic and operation range may be obtained. By using such an arrangement, a pulsating voltage variation of parabolic wave form may be produced across the element 40, and when such a wave form is differentiated, a linear voltage variation is produced.

A similar result may be accomplished by using "Thyrite" as the element 40. The resistance of "Thyrite" varies as a function of applied potential, and decreases with an increase in the applied potential. This change in resistance and the resulting current flow produces a potential drop across the resistance 38 so the voltage variations of parabolic wave form are present across the element 40.

For performing the differentiation, a condenser 42 and resistance 43 are provided, and one output terminal 44 is connected to the junction of these elements. Another output terminal 46 is connected to the midpoint of the secondary of the transformer.

Inasmuch as the first derivative of a parabolic curve is a straight line, the potential variation available at the output terminals 44—46 will have a sawtooth wave form so that when this voltage variation is applied to the deflecting electrodes of a cathode ray tube, the cathode ray beam will be deflected at a constant rate in one direction, and will be returned to its initial starting point in a substantially instantaneous manner. The linear voltage variation available at the output terminals 44—46 is represented by the curve E in Figure 4.

Figure 4:
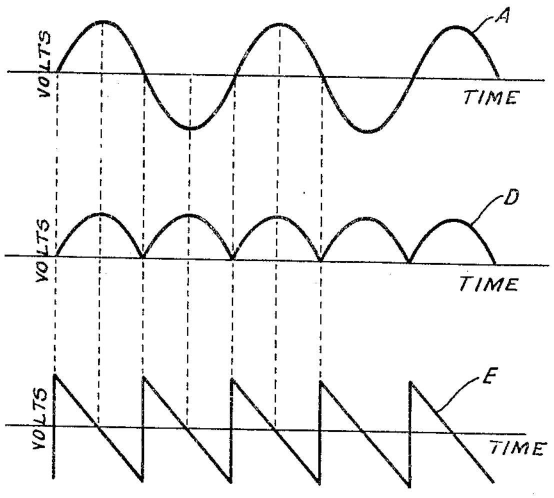
Figure 4 shows a series of curves representing potential variations at various points in Figure 3.
Figure 5:
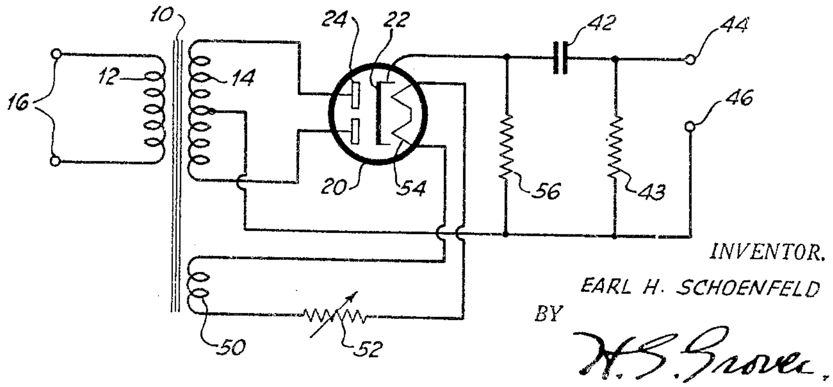
Figure 5 shows a modification of the circuit shown in Figure 3.

In Figure 5 is shown a modification of the circuit shown in Figure 3, which modification is effective to produce the substantially linear voltage variations represented by the curve E in Figure 4. It has been found that a pulsating voltage variation of parabolic wave form such as represented by the curve D in Figure 4 may be produced at the cathode of a full wave rectifier if the maximum emission of the cathode is limited. To accomplish this, the temperature of the cathode is reduced by operating the heater on reduced voltage. For this purpose, a secondary winding 50 is provided on the transformer 10 for supplying heater potentials. The winding 50 is connected to the heater 54 of the full wave rectifier 20, and an adjustable resistance 52 is included in this connection. By reducing the voltage applied to the heater 54, the temperature of the cathode 22 may be reduced, and by proper adjustment of the resistance 52 a voltage variation of parabolic wave form may be produced at the cathode of the rectifier tube.

Under these circumstances it is no longer necessary to use an element corresponding to the load element 40 in Figure 3, and accordingly a conventional load resistance 56 may be used in Figure 5. A differentiating network including condenser 42 and resistance 43 is provided, as in Figure 3. The operation of the circuit shown in Figure 5 is similar to that of Figure 3, and the curves shown in Figure 4 representing potential variations are applicable to Figure 5.

It is also possible to produce the desired parabolic voltage variation at the cathode of the full wave rectifier by using a relatively low resistance load so that the internal impedance of the tube is effective to alter the voltage variation from that of a half sine wave to a parabola.

In either of the circuits represented in Figures 1 or 3, the transformer 10 may be dispensed with and the applied voltage variations, such as represented by the curve A in Figures 2 or 4, may be applied directly between one end of the secondary winding 14 and the midpoint thereof. The use of the transformer permits obtaining higher or lower potential variations at the output terminals, and the intensity of these potentials may also readily be controlled by a potential divider in the output circuit or by appropriate voltage control means at the input terminals of the circuit arrangement.

It may be seen, therefore, that through the use of a simple and convenient circuit arrangement and by the use of differentiation, a cathode ray beam in a cathode ray tube may be deflected in accordance with a sinusoidal function or it may be deflected linearly, in either case the cathode ray beam being returned to its initial starting point in a substantially instantaneous manner. Such deflection potentials are particularly useful in connection with cathode ray oscillographic apparatus.

It is apparent that various alterations and modifications may be made in the present invention without departing from the spirit and scope thereof, and it is desired that any and all such alterations and modifications be considered within the purview of the present invention except as limited by the hereinafter appended claims.

Having now described my invention, what I claim as new and desire to have protected by Letters Patent is:

1. A system for producing voltage variations of a predetermined wave form comprising an input transformer having a center tapped secondary winding, a full wave rectifier including a pair of electron discharge paths each including an electron emitter and a collector electrode, means for connecting the collector electrodes to opposite ends of said secondary winding, means including a pair of series connected load impedances, at least one of which has a negative temperature coefficient, connected between said emitters and said center tap on the secondary winding, a differentiating network including a series connected condenser and resistance, means for connecting said differentiating network in parallel with said negative temperature coefficient load impedance, a pair of output terminals connected across the resistance element of said differentiating network, and means to apply voltage variations of substantially sinusoidal wave form to the collector electrodes of said full wave rectifier whereby uni-polarity pulsating potentials of parabolic wave form are produced across said negative temperature coefficient load impedance, so that voltage variations of substantially sawtooth wave form are available at said output terminals.

2. A system for producing voltage variations of a predetermined wave form comprising an input transformer having a center tapped secondary winding, a full wave rectifier including a cathode and a pair of anodes, means for connecting the anodes to opposite ends of said secondary winding, means including a load impedance having a negative temperature coefficient connected between said cathode and said center tap on the secondary winding, a differentiating network including a series connected condenser and resistance, means for connecting said differentiating network in parallel with at least a portion of said load impedance, a pair of output terminals connected across the resistance element of said differentiating network, and means to apply voltage variations of substantially sinusoidal wave form to the anodes of said full wave rectifier whereby uni-polarity pulsating voltage variations of parabolic wave form are produced across at least a portion of said load impedance, so that voltage variations corresponding to the first derivative of the parabolic uni-polarity pulsating potentials are available at said output terminals.

3. A system for producing voltage variations of a predetermined wave form comprising an input transformer having a center tapped secondary winding, a full wave rectifier including a cathode and a pair of anodes, means for connecting the anodes to opposite ends of said secondary winding, a load element connected between said cathode and said center tap on the secondary winding, said load element having a variable impedance determined by the potential applied thereto, a differentiating network including a series connected condenser and resistance, means for connecting said differentiating network in parallel with at least a portion of said load element, a pair of output terminals connected across the resistance element of said differentiating network, means to apply voltage variations of substantially sinusoidal wave form to the anodes of said full wave rectifier whereby uni-polarity pulsating potentials or voltage variations of parabolic wave form are present across said differentiating network, so that voltage varations of substantially sawtooth wave form are available at said output terminals.

4. The method of producing voltage variations of substantially linear sawtooth wave form from a voltage variation of sinusoidal wave form which comprises the steps of converting the voltage varations of substantially sinuosidal wave form to uni-polarity pulsating potentials of parabolic wave form, and producing from the parabolic voltage variations a first derivative voltage variation to thereby generate substantially linear voltage variations of sawtooth wave form.

5. The method of producing voltage variations of substantially linear sawtooth wave form from a voltage variation of sinusoidal wave form which comprises the steps of converting the voltage variations of substantially sinusoidal wave form to uni-polarity pulsating potentials of parabolic wave form, and differentiating the pulsating parabolic voltage variations thereby to generate substantially linear voltage variations of sawtooth wave form.

EARL H. SCHOENFELD.

REFERENCES CITED

The following references are of record in the file of this patent:

UNITED STATES PATENTS

| Number | Name | Date |
|---|---|---|
| 2,078,644 | Swedlund ---------- | Apr. 27, 1937 |
| 2,244,003 | Eaglesfield et al. ----- | June 3, 1941 |